United States Patent

Higashimura et al.

(10) Patent No.: US 6,576,800 B2
(45) Date of Patent: Jun. 10, 2003

(54) OXIDATION POLYMER OF A SUBSTITUTED PHENOL

(75) Inventors: Hideyuki Higashimura, Tsukuba (JP); Shiro Kobayashi, Kyoto (JP)

(73) Assignees: National Institute of Advanced Industrial Science and Technology, Tokyo (JP); Japan Chemical Innovation Institute, Tokyo (JP)

( * ) Notice: Subject to any disclaimer, the term of this patent is extended or adjusted under 35 U.S.C. 154(b) by 0 days.

(21) Appl. No.: 09/905,978

(22) Filed: Jul. 17, 2001

(65) Prior Publication Data

US 2002/0028907 A1 Mar. 7, 2002

(30) Foreign Application Priority Data

Jul. 17, 2000 (JP) .......... 2000-216482
Jul. 17, 2000 (JP) .......... 2000-216485

(51) Int. Cl.[7] .............................. C07C 41/00
(52) U.S. Cl. .............. 568/638; 528/212; 528/218; 568/636; 568/637
(58) Field of Search ............... 568/636, 637, 568/638; 528/212, 218

(56) References Cited

U.S. PATENT DOCUMENTS

| | | | |
|---|---|---|---|
| 4,481,332 A | * | 11/1984 | Somomiya |
| 5,037,943 A | * | 8/1991 | Shaffer |
| 5,159,018 A | * | 10/1992 | Nishio |
| 5,183,849 A | * | 2/1993 | Yamaguchi |
| 5,202,409 A | * | 4/1993 | Tsukahara |
| 5,420,184 A | * | 5/1995 | Tsukahara |
| 6,069,206 A | * | 5/2000 | Nishihara |

FOREIGN PATENT DOCUMENTS

JP        36-18692        6/1958

OTHER PUBLICATIONS

Cayrol et al., "Viscoelastic Properties of Poly (phenylene ethers). II. 2-Methyl-6-alkyl-Substituted Polymers," *Macromolecules*, Nov.-Dec. 1972, pp. 676-682, vol. 5, No. 6.

Cooper, "Sodium Salts of Sulfonated Poly (Phenylene Ethers) as Polysoaps," *Journal of Polymer Science, Part A-1*, 1971, pp. 2361-2369, vol. 9.

Kricheldorf et al., "Layer Structures. 3. Poly (p-phenylene-terephthalate)s with One, Two, or Four Alkyl Substituents: Thermotropic and Isotropic Rigid Rods," *Macromolecules*, 1996, pp. 1337-1344, vol. 29, No. 4, American Chemical Society.

McCarley et al., "Optical, electrical, and electrochemical characteristics of ultrathin poly(phenylene oxide) films: organic dielectrics less than 100 nm thick," *J. Electroanal. Chem.*, 1990, pp. 79-92, vol. 290, Elsevier Sequoia S.A., Lausanne.

Zheng et al., "Characterization and Solid–State Properties of Processable N-Alkylated Polyanilines in the Neutral State," *Macromolecules*, 1994, p. 7754-7768, vol. 27, No. 26, American Chemical Society.

Higashimura et al., Kagaku to Kogyo, vol. 53, No. 4, pp. 501-505 (2000). Partial Translation.

\* cited by examiner

*Primary Examiner*—Michael L. Shippen
(74) *Attorney, Agent, or Firm*—Birch, Stewart, Kolasch & Birch, LLP

(57) ABSTRACT

An oxidation polymer of a substituted phenol, obtained by oxidative polymerization of at least one compound selected from the group consisting of a compound of formula (Ia) and a compound of formula (Ib), in which the oxidation polymer has a number-average polymerization degree of 3 or more:

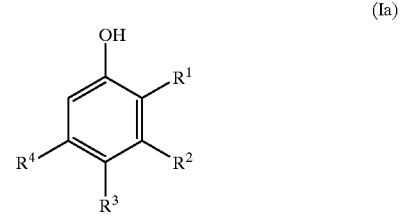

(Ia)

wherein $R^1$ to $R^4$ each represent a hydrogen atom and the like; provided that at least one of $R^1$ to $R^4$ represents a substituted or unsubstituted, saturated hydrocarbon group having 10 or more carbon atoms, and $R^1$ and/or $R^4$ represent a hydrogen atom;

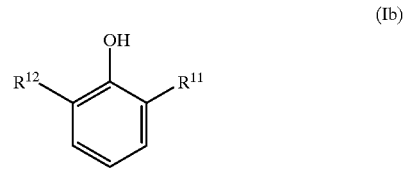

(Ib)

wherein $R^{11}$ represents a substituted or unsubstituted, saturated hydrocarbon group having 15 or more carbon atoms, and $R^{12}$ is the same as $R^{11}$, or when $R^{12}$ is different from $R^{11}$, $R^{12}$ represents a substituted or unsubstituted hydrocarbon group and the like.

20 Claims, No Drawings

OXIDATION POLYMER OF A SUBSTITUTED PHENOL

FIELD OF THE INVENTION

The present invention relates to a novel oxidation polymer of a substituted phenol.

BACKGROUND OF THE INVENTION

Conventionally, for an oxidation polymer of a substituted phenol, though concern has been concentrated mainly on oxidation polymers of 2,6-di-substituted phenols, recently, there is also a notice on oxidation polymers of phenols having no substituent at the 2- and/or the 6-position (Kagaku to Kogyo, vol. 53, no. 4, pp. 501 to 505 (2000)).

On the other hand, aromatic polymers carrying a saturated hydrocarbon group having a large number of carbon atoms have been developed, and various characteristics have been found regarding the crystallinity, liquid crystallinity, viscoelasticity, solubility, and the like, of the polymers. In Macromolecules, 29, 1337, (1996), aromatic polyesters as described above are described, and in Macromolecules, 27, 7754 (1994), polyanilines as described above are described.

However, regarding the oxidation polymers of phenols including no substituent on the 2- and/or the 6-position having a saturated hydrocarbon group with a large number of carbon atoms, only an oxidation polymer of nonylphenol has been reported (J. Electroamal. Chem., 290, 79 (1990)), and there is no description of the crystallinity of this polymer. Further, also regarding oxidation polymers of 2,6-di-substituted phenols carrying a saturated hydrocarbon substituent having a large number of carbon atoms, only those carrying a substituent having 14 or less carbon atoms, such as an oxidation polymer of 2-methyl-6-tetradecylphenol (J. Polym. Sci. Part A-1, 9, 2361 (1971)), an oxidation polymer of 2-methyl-6-(2-tetradecyl)phenol (Macromolecules, 5, 676 (1972)) and the like, have been reported, and there is also no description regarding crystallinity thereof.

In poly(1,4-phenylene oxide) and poly(2,5-dimethyl-1,4-phenylene oxide), which are oxidation polymers of a phenol including no substitution on the 2- and/or the 6-position, the crystal melting point derived from the main chain is observed even after melting-cooling, while in poly(2,6-dimethyl-1,4-phenylene oxide), the crystal melting point is not detected at all after melting-cooling (Kagaku to Kogyo, vol. 53, no. 4, pp. 501 to 505 (2000)). Namely, in general, it may be guessed that the oxidation polymers of 2,6-di-substituted phenols do not cause crystallization easily, and crystallization does not occur even if the number of carbon atoms of a substituent is 14.

SUMMARY OF THE INVENTION

The present invention is an oxidation polymer of a substituted phenol, which is obtained by oxidative polymerization of at least one substituted phenol compound selected from the group consisting of a substituted phenol compound represented by the following formula (Ia), and a 2,6-di-substituted phenol compound represented by the following formula (Ib), wherein the oxidation polymer has a number-average degree of polymerization of 3 or more:

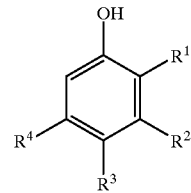
(Ia)

wherein, in formula (Ia), $R^1$, $R^2$, $R^3$, and $R^4$ each individually represent a hydrogen atom, a substituted or unsubstituted hydrocarbon group, a substituted or unsubstituted hydrocarbon oxy group, a substituted or unsubstituted amino group, a substituted or unsubstituted mercapto group, or a halogen atom; $R^1$ and $R^2$, $R^2$ and $R^3$, or $R^3$ and $R^4$ may form a ring; provided that at least one of $R^1$ to $R^4$ represents a substituted or unsubstituted, saturated hydrocarbon group having 10 or more carbon atoms, and $R^1$ and/or $R^4$ represent a hydrogen atom; and

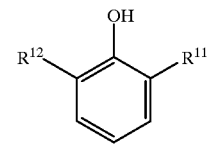
(Ib)

wherein, in formula (Ib), $R^{11}$ represents a substituted or unsubstituted, saturated hydrocarbon group having 15 or more carbon atoms, and $R^{12}$ is the same group as $R^{11}$, or when $R^{12}$ is different from $R^{11}$, $R^{12}$ represents a substituted or unsubstituted hydrocarbon group, a substituted or unsubstituted hydrocarbon oxy group, a substituted or unsubstituted amino group, a substituted or unsubstituted mercapto group, or a halogen atom.

Further, the present invention is an oxidation polymer of a substituted phenol, which is obtained by oxidative polymerization of at least one substituted phenol compound selected from the group consisting of a substituted phenol compound represented by the formula (Ia), and a 2,6-di-substituted phenol compound represented by the formula (Ib), wherein the oxidation polymer has a number-average degree of polymerization of 3 or more, and a crystal melting point of 5 J/g or more, −100° C. or higher and less than 300° C.:

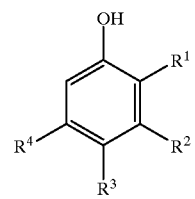
(Ia)

wherein, in formula (Ia), $R^1$, $R^2$, $R^3$, and $R^4$ each individually represent a hydrogen atom, a substituted or unsubstituted hydrocarbon group, a substituted or unsubstituted hydrocarbon oxy group, a substituted or unsubstituted amino group, a substituted or unsubstituted mercapto group, or a halogen atom; $R^1$ and $R^2$, $R^2$ and $R^3$, or $R^3$ and $R^4$ may form a ring; provided that at least one of $R^1$ to $R^4$ represents a substituted or unsubstituted, saturated hydrocarbon group having 10 or more carbon atoms, and $R^1$ and/or $R^4$ represent a hydrogen atom; and

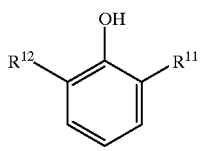

(Ib)

wherein $R^{11}$ represents a substituted or unsubstituted, saturated hydrocarbon group having 15 or more carbon atoms (preferably having 16 or more carbon atoms), and $R^{12}$ is the same group as $R^{11}$, or when $R^{12}$ is different from $R^{11}$, $R^{12}$ represents a substituted or unsubstituted hydrocarbon group, a substituted or unsubstituted hydrocarbon oxy group, a substituted or unsubstituted amino group, a substituted or unsubstituted mercapto group, or a halogen atom.

Other and further features, and advantages of the invention will appear more fully from the following description.

DETAILED DESCRIPTION OF THE INVENTION

The oxidation polymer of a substituted phenol of the present invention is an oxidation polymer, which is obtained by oxidative polymerization of at least one compound selected from the group consisting of a substituted phenol compound represented by the formula (Ia), and a 2,6-di-substituted phenol compound represented by the formula (Ib), wherein the oxidation polymer has a number-average polymerization degree of 3 or more.

The substituted phenol compounds represented by the formula (Ia) are explained below.

When $R^1$ to $R^4$ in the above-mentioned formula (Ia) represent a hydrocarbon group, it is preferably an alkyl group having 1 to 100 carbon atoms (more preferably having 1 to 50 carbon atoms), a cycloalkyl group having 3 to 100 carbon atoms (more preferably having 3 to 50 carbon atoms), an aralkyl group having 7 to 30 carbon atoms (more preferably having 7 to 20 carbon atoms, particularly preferably having 7 to 9 carbon atoms) or an aryl group having 6 to 30 carbon atoms (more preferably having 6 to 20 carbon atoms, particularly preferably having 6 to 9 carbon atoms). Specific examples thereof include methyl group, ethyl group, n-propyl group, iso-propyl group, n-butyl group, iso-butyl group, t-butyl group, pentyl group, cyclopentyl group, hexyl group, cyclohexyl group, octyl group, nonyl group, benzyl group, 2-phenylethyl group, 1-phenylethyl group, phenyl group, 4-methylphenyl group, 4-ethylphenyl group, and the like.

When $R^1$ to $R^4$ in the above-mentioned formula (Ia) represent a substituted hydrocarbon group, it is preferably an alkyl group having 1 to 100 carbon atoms (more preferably having 1 to 50 carbon atoms), a cycloalkyl group having 3 to 100 carbon atoms (more preferably having 3 to 50 carbon atoms), an aralkyl group having 7 to 30 carbon atoms (more preferably having 7 to 20 carbon atoms, particularly preferably having 7 to 9 carbon atoms), or an aryl group having 6 to 30 carbon atoms (more preferably having 6 to 20 carbon atoms, particularly preferably having 6 to 9 carbon atoms), each of which is substituted by a halogen atom, a hydroxyl group, an alkoxy group, an amino group, a substituted amino group, and the like. Specific examples thereof include a trifluoromethyl group, 2-t-butyloxyethyl group, 3-dimethylaminopropyl group, and the like.

When $R^1$ to $R^4$ in the above-mentioned formula (Ia) represent a hydrocarbon oxy group, it is preferably an alkoxy group having 1 to 30 carbon atoms (more preferably having 1 to 20 carbon atoms, particularly preferably having 1 to 9 carbon atoms), a cycloalkoxy group having 3 to 30 carbon atoms (more preferably having 3 to 20 carbon atoms, particularly preferably having 3 to 9 carbon atoms), an aralkyloxy group having 7 to 30 carbon atoms (more preferably having 7 to 20 carbon atoms, particularly preferably having 7 to 9 carbon atoms), or an aryloxy group having 6 to 30 carbon atoms (more preferably having 6 to 20 carbon atoms, particularly preferably having 6 to 9 carbon atoms). Specific examples thereof include methoxy group, ethoxy group, n-propoxy group, iso-propoxy group, n-butoxy group, iso-butoxy group, t-butoxy group, pentyloxy group, cyclopentyloxy group, hexyloxy group, cyclohexyloxy group, octyloxy group, nonyloxy group, benzyloxyl group, 2-phenylethoxy group, 1-phenylethoxy group, phenyloxy group, 4-methylphenyloxy group, 4-ethylphenyloxy group, and the like.

When $R^1$ to $R^4$ in the above-mentioned formula (Ia) represent a substituted hydrocarbon oxy group, it is preferably an alkoxy group having 1 to 30 carbon atoms (more preferably having 1 to 10 carbon atoms, further preferably having 1 to 9 carbon atoms), a cycloalkoxy group having 3 to 30 carbon atoms (more preferably having 3 to 20 carbon atoms, particularly preferably having 3 to 9 carbon atoms), an aralkyloxy group having 7 to 30 carbon atoms (more preferably having 7 to 20 carbon atoms, particularly preferably having 7 to 9 carbon atoms), or an aryloxy group having 6 to 30 carbon atoms (more preferably having 6 to 20 carbon atoms, particularly preferably having 6 to 9 carbon atoms), each of which is substituted by a halogen atom, an alkoxy group, an amino group, a substituted amino group, and the like. Specific examples thereof include trifluoromethoxy group, 2-t-buthyloxyethoxy group, 3-dimethylaminopropoxy group, and the like.

When $R^1$ to $R^4$ in the above-mentioned formula (Ia) represent a substituted amino group, it is preferably an amino group substituted by an alkyl group having 1 to 30 carbon atoms (more preferably having 1 to 20 carbon atoms), a cycloalkyl group having 3 to 30 carbon atoms (more preferably having 3 to 20 carbon atoms), an aralkyl group having 7 to 30 carbon atoms (more preferably having 7 to 20 carbon atoms), or an aryl group having 6 to 30 carbon atoms (more preferably having 6 to 20 carbon atoms). Specific examples thereof include methylamino group, dimethylamino group, diethylamino group, di-n-propylamino group, di-iso-propylamino group, di-n-butylamino group, di-iso-butylamino group, di-t-butylamino group, dipentylamino group, dicyclopentylamino group, dihexylamino group, dicyclohexylamino group, dioctylamino group, dinonylamino group, dibenzylamino group, di-2-phenylethylamino group, di-1-phenylethylamino group, diphenylamino group, di-4-methylphenylamino group, di-4-ethylphenylamino group, and the like.

When $R^1$ to $R^4$ in the above-mentioned formula (Ia) represent a substituted mercapto group, it is preferably an alkylmercapto group having 1 to 30 carbon atoms (more preferably having 1 to 20 carbon atoms), a cycloalkylmercapto group having 3 to 30 carbon atoms (more preferably having 3 to 20 carbon atoms), an aralkylmercapto group having 7 to 30 carbon atoms (more preferably having 7 to 20 carbon atoms), or an arylmercapto group having 6 to 30 carbon atoms (more preferably having 6 to 20 carbon atoms). Specific examples thereof include methylmercapto group, ethylmercapto group, n-propylmercapto group, iso-propylmercapto group, n-butylmercapto group, iso-butylmercapto group, t-butylmercapto group, pentylmercapto group, cyclopentylmercapto group, hexylmercapto group, cyclohexylmercapto group, octylmercapto group, nonylmercapto group, benzylmercapto group, 2-phenylethylmercapto group, 1-phenylethylmercapto group, phenylmercapto group, 4-methylphenylmercapto group, 4-ethylphenylmercapto group, and the like.

When $R^1$ to $R^4$ in the above-mentioned formula (Ia) represent a halogen atom, it is a fluorine atom, a chlorine atom, a bromine atom, or an iodine atom, more preferably a fluorine atom, a chlorine atom, or a bromine atom, further preferably a fluorine atom or a chlorine atom.

Regarding $R^1$ to $R^4$ in the above-mentioned formula (Ia), when $R^1$ and $R^2$, $R^2$ and $R^3$, or $R^3$ and $R^4$ form a ring, it is preferably a 5- to 7-membered ring, and it is more preferably that $R^1$ and $R^2$, $R^2$ and $R^3$, or $R^3$ and $R^4$ each form —(CH$_2$)$_3$— group, —(CH$_2$)$_4$— group, or —CH=CH—CH=CH— group constituting a ring.

At least one group of $R^1$ to $R^4$ in the above-mentioned formula (Ia), is a substituted or unsubstituted, saturated hydrocarbon group having 10 or more carbon atoms. The number of substitution of these groups is from 1 to 3, preferably 1 to 2, more preferably 1.

The number of carbon atoms of an unsubstituted saturated hydrocarbon group as at least one group of $R^1$ to $R^4$ in the above-mentioned formula (Ia), is preferably from 10 to 100, more preferably from 10 to 50, further preferably from 12 to 30, particularly preferably from 15 to 22. The above-mentioned saturated hydrocarbon group is preferably an alkyl group or a cycloalkyl group, more preferably an alkyl group, further preferably —(CH$_2$)$_{n-1}$CH$_3$ or —CH(CH$_3$)(CH$_2$)$_{n-3}$CH$_3$ (wherein n represents the number of carbon atoms).

The substituted saturated hydrocarbon group as at least one group of $R^1$ to $R^4$ in the above-mentioned formula (Ia), is preferably the above-mentioned saturated hydrocarbon group substituted by a halogen atom, a hydroxyl group, an alkoxy group, an amino group, a substituted amino group, and the like, more preferably the above-mentioned saturated hydrocarbon group substituted by a fluorine atom.

At least one group of $R^1$ to $R^4$ in the above-mentioned formula (Ia), is preferably a saturated hydrocarbon group.

In $R^1$, $R^2$ and $R^4$ in the above-mentioned formula (Ia), as another group other than the substituent having 10 or more carbon atoms, it is preferably a hydrogen atom, a hydrocarbon group having 1 to 9 carbon atoms, a hydrocarbon oxy group having 1 to 9 carbon atoms, or a halogen atom. It is more preferably a hydrogen atom or a hydrocarbon group having 1 to 6 carbon atoms, further preferably a hydrogen atom or a hydrocarbon group having 1 to 4 carbon atoms, particularly preferably a hydrogen atom or methyl group. In $R^3$ in the above-mentioned formula (Ia), as another group other than the substituent having 10 or more carbon atoms, it is preferably a hydrogen atom, a hydrocarbon group having 1 to 9 carbon atoms, a hydrocarbon oxy group having 1 to 9 carbon atoms, or a halogen atom. It is more preferably a hydrogen atom, a hydrocarbon group having 1 to 6 carbon atoms, or a hydrocarbon oxy group having 1 to 6 carbon atoms, further preferably a hydrogen atom or a phenoxy group, particularly preferably a hydrogen atom.

Next, the 2,6-di-substituted phenol compound represented by the formula (Ib) is described below.

In the above-mentioned formula (Ib), $R^{11}$ represents a substituted or unsubstituted, saturated hydrocarbon group having 15 or more carbon atoms.

The number of carbon atoms of a saturated hydrocarbon group $R^{11}$ in the above-mentioned formula (Ib), is generally 15 or more, preferably from 15 to 100, more preferably from 16 to 50, further preferably from 18 to 30, particularly preferably from 18 to 22. The above-mentioned saturated hydrocarbon group is preferably an alkyl group or a cycloalkyl group, more preferably an alkyl group, further preferably —(CH$_2$)$_{n-1}$CH$_3$ or —CH(CH$_3$)(CH$_2$)$_{n-3}$CH$_3$ (wherein n represents the number of carbon atoms).

The substituted saturated hydrocarbon group as $R^{11}$ in the above-mentioned formula (Ib) is preferably the above-mentioned saturated hydrocarbon group substituted by a halogen atom, a hydroxyl group, an alkoxy group, an amino group, a substituted amino group, and the like, more preferably the above-mentioned saturated hydrocarbon group substituted by a fluorine atom.

$R^{11}$ in the above-mentioned formula (Ib) is preferably an unsubstituted saturated hydrocarbon group.

In the above-mentioned formula (Ib), $R^{12}$ is the same group as $R^{11}$, or when $R^{12}$ is different from $R^{11}$, $R^{12}$ represents a substituted or unsubstituted hydrocarbon group, a substituted or unsubstituted hydrocarbon oxy group, a substituted or unsubstituted amino group, a substituted or unsubstituted mercapto group, or a halogen atom.

When $R^{12}$ is different from $R^{11}$, the hydrocarbon group as $R^{12}$ in the above-mentioned formula (Ib) is preferably an alkyl group having 1 to 30 carbon atoms (further preferably having 1 to 22 carbon atoms), a cycloalkyl group having 3 to 30 carbon atoms (further preferably having 3 to 22 carbon atoms), an aralkyl group having 7 to 30 carbon atoms (further preferably having 7 to 22 carbon atoms), or an aryl group having 6 to 30 carbon atoms (further preferably having 6 to 22 carbon atoms), and specifically, the above-mentioned substituents are listed.

When $R^{12}$ is different from $R^{11}$, the substituted hydrocarbon group as $R^{12}$ in the above-mentioned formula (Ib) is preferably an alkyl group having 1 to 30 carbon atoms (further preferably having 1 to 22 carbon atoms), a cycloalkyl group having 3 to 30 carbon atoms (further preferably having 3 to 22 carbon atoms), an aralkyl group having 7 to 30 carbon atoms (further preferably having 7 to 22 carbon atoms), or an aryl group having 6 to 30 carbon atoms (further preferably having 6 to 22 carbon atoms), each of which is substituted by a halogen atom, an alkoxy group, an amino group, a substituted amino group, and the like, and specifically, the above-mentioned substituents are listed.

The hydrocarbon oxy group as $R^{12}$ in the above-mentioned formula (Ib) is preferably an alkoxy group having 1 to 30 carbon atoms (further preferably having 1 to 20 carbon atoms), a cycloalkoxy group having 3 to 30 carbon atoms (further preferably having 3 to 20 carbon atoms), an aralkyloxy group having 7 to 30 carbon atoms (further preferably having 7 to 20 carbon atoms), or an aryloxy group having 6 to 30 carbon atoms (further preferably having 6 to 20 carbon atoms), and specifically, the above-mentioned substituents are listed.

The substituted hydrocarbon oxy group as $R^{12}$ in the above-mentioned formula (Ib) is preferably an alkoxy group having 1 to 30 carbon atoms (further preferably having 3 to 20 carbon atoms), a cycloalkoxy group having 3 to 30 carbon atoms (further preferably having 3 to 20 carbon atoms), an aralkyloxy group having 7 to 30 carbon atoms (further preferably having 7 to 20 carbon atoms), or an aryloxy group having 6 to 30 carbon atoms (further preferably having 6 to 20 carbon atoms), each of which is substituted by a halogen atom, an alkoxy group, an amino group, a substituted amino group, and the like, and specifically, the above-mentioned substituents are listed.

The substituted amino group as $R^{12}$ in the above-mentioned formula (Ib) is preferably an alkyl group having 1 to 30 carbon atoms (further preferably having 1 to 20 carbon atoms), a cycloalkyl group having 3 to 30 carbon atoms (further preferably having 3 to 20 carbon atoms), an aralkyl group having 7 to 30 carbon atoms (further preferably having 7 to 20 carbon atoms), or an aryl group having 6 to 30 carbon atoms (further preferably having 6 to 20 carbon atoms), and specifically, the above-mentioned substituents are listed.

The substituted mercapto group as $R^{12}$ in the above-mentioned formula (Ib) is preferably an alkylmercapto group having 1 to 30 carbon atoms (further preferably having 1 to 20 carbon atoms), a cycloalkylmercapto group having 3 to 30 carbon atoms (further preferably having 3 to 20 carbon atoms), an aralkylmercapto group having 7 to 30 carbon atoms (further preferably having 7 to 20 carbon atoms), or an arylmercapto group having 6 to 30 carbon atoms (further preferably having 6 to 20 carbon atoms), and specifically, the above-mentioned substituents are listed.

The halogen atom as $R^{12}$ in the above-mentioned formula (Ib) is a fluorine atom, a chlorine atom, a bromine atom, or an iodine atom, preferably a fluorine atom, a chlorine atom, or a bromine atom, more preferably a fluorine atom or a chlorine atom.

When $R^{12}$ is different from $R^{11}$, $R^{12}$ in the above-mentioned formula (Ib) is preferably a hydrocarbon group having 1 to 9 carbon atoms, a hydrocarbon oxy group having 1 to 9 carbon atoms, or a halogen atom, more preferably a hydrocarbon group having 1 to 9 carbon atoms or a hydrocarbon oxy group having 1 to 9 carbon atoms, further preferably a hydrocarbon group having 1 to 9 carbon atoms, particularly preferably a hydrocarbon group having 1 to 6 carbon atoms.

The polymer of the present invention may be obtained by oxidative polymerization of a substituted phenol compound represented by the above-mentioned formula (Ia) used alone or in admixture thereof, or it may be obtained by oxidative polymerization of a 2,6-disubstituted phenol compound represented by the above-mentioned formula (Ib) used alone or in admixture thereof. Alternatively, the polymer of the present invention may be obtained by oxidative polymerization of one or more kinds of the compound represented by the above-mentioned formula (Ia), together with one or more kinds of the compound represented by the above-mentioned formula (Ib). Further, the polymer of the present invention may be obtained by oxidative polymerization of a compound represented by the above-mentioned formula (Ia) and/or a compound represented by the above-mentioned formula (Ib), together with a phenol compound represented by the following formula (II), a phenol compound represented by the following formula (III), and/or a bis-phenol compound represented by the following formula (IV).

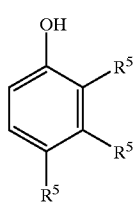

(II)

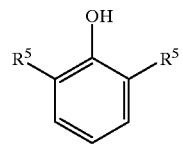

(III)

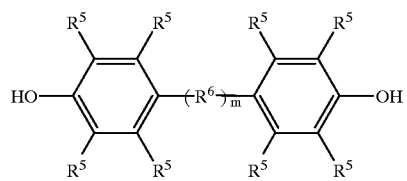

(IV)

In the formulae (II), (III), and (IV), each of $R^5$ is independently a hydrogen atom, a substituted or unsubstituted hydrocarbon group having 1 to 9 carbon atoms, a substituted or unsubstituted hydrocarbon oxy group having 1 to 9 carbon atoms, an amino group, a substituted amino group having 1 to 9 carbon atoms, a mercapto group, a substituted mercapto group having 1 to 9 carbon atoms, or a halogen atom, and two adjacent $R^5$ may form a ring. $R^6$ represents an oxygen atom, a sulfur atom, a divalent hydrocarbon group, or a divalent substituted hydrocarbon group, and m is 1 or 0.

The hydrocarbon group as $R^5$ in the above-mentioned formulae (II) to (IV), represents preferably an alkyl group having 1 to 9 carbon atoms, a cycloalkyl group having 3 to 9 carbon atoms, an aralkyl group having 7 to 9 carbon atoms, or an aryl group having 6 to 9 carbon atoms. Specific examples thereof include methyl group, ethyl group, n-propyl group, iso-propyl group, n-butyl group, iso-butyl group, t-butyl group, pentyl group, cyclopentyl group, hexyl group, cyclohexyl group, octyl group, nonyl group, benzyl group, 2-phenylethyl group, 1-phenylethyl group, phenyl group, 4-methylphenyl group, 4-ethylphenyl group, and the like.

The substituted hydrocarbon group as $R^5$ in the above-mentioned formulae (II) to (IV), represents preferably an alkyl group having 1 to 9 carbon atoms, a cycloalkyl group having 3 to 9 carbon atoms, an aralkyl group having 7 to 9 carbon atoms, or an aryl group having 6 to 9 carbon atoms, each of which is substituted with a halogen atom, an alkoxy group, an amino group, a substituted amino group, and the like. Specific examples thereof include trifluoromethyl group, 2-t-butyloxyethyl group, 3-dimethylaminopropyl group, and the like.

The hydrocarbon oxy group as $R^5$ in the above-mentioned formulae (II) to (IV), represents preferably an alkoxy group having 1 to 9 carbon atoms, a cycloalkoxy group having 3 to 9 carbon atoms, an aralkyloxy group having 7 to 9 carbon atoms, or an aryloxy group having 6 to 9 carbon atoms. Specific examples thereof include a methoxy group, ethoxy group, n-propoxy group, iso-propoxy group, n-butoxy group, iso-butoxy group, t-butoxy group, pentyloxy group, cyclopentyloxy group, hexyloxy group, cyclohexyloxy group, octyloxy group, nonyloxy group, benzyloxy group, 2-phenylethoxy group, 1-phenylethoxy group, phenyloxy group, 4-methylphenyloxy group, 4-ethylphenyloxy group, and the like.

The substituted hydrocarbon oxy group as $R^5$ in the above-mentioned formulae (II) to (IV), represents preferably an alkoxy group having 1 to 9 carbon atoms, a cycloalkoxy group having 3 to 9 carbon atoms, an aralkyloxy group having 7 to 9 carbon atoms, or an aryloxy group having 6 to 9 carbon atoms, each of which is substituted by a halogen atom, an alkoxy group, an amino group, a substituted amino group, and the like. Specific examples thereof include trifluoromethoxy group, 2-t-butyloxyethoxy group, 3-dimethylaminopropoxy group, and the like.

The substituted amino group as $R^5$ in the above-mentioned formulae (II) to (IV), represents preferably an amino group substituted by an alkyl group having 1 to 9 carbon atoms, a cycloalkyl group having 3 to 9 carbon atoms, an aralkyl group having 7 to 9 carbon atoms, or an aryl group having 6 to 9 carbon atoms. Specific examples thereof include methylamino group, dimethylamino group, diethylamino group, di-n-propylamino group, di-isopropylamino group, di-n-butylamino group, di-isobutylamino group, di-t-butylamino group, pentylamino group, cyclopentylamino group, hexylamino group, cyclohexylamino group, octylamino group, nonylamino group, benzylamino group, 2-phenylethylamino group, 1-phenylethylamino group, phenylamino group, 4-methylphenylamino group, 4-ethylphenylamino group, and the like.

The substituted mercapto group as $R^5$ in the above-mentioned formulae (II) to (IV), is preferably an alkylmercapto group having 1 to 9 carbon atoms, a cycloalkylmercapto group having 3 to 9 carbon atoms, an aralkylmercapto group having 7 to 9 carbon atoms, or an arylmercapto group having 6 to 9 carbon atoms. Specific examples thereof include methylmercapto group, ethylmercapto group, n-propylmercapto group, iso-propylmercapto group, n-butylmercapto group, iso-butylmercapto group, t-butylmercapto group, pentylmercapto group, cyclopentylmercapto group, hexylmercapto group, cyclohexylmercapto group, octylmercapto group, nonylmercapto group, benzylmercapto group, 2-phenylethylmercapto group, 1-phenylethylmercapto group, phenylmercapto group, 4-methylphenylmercapto group, 4-ethylphenylmercapto group, and the like.

The halogen atom as $R^5$ in the above-mentioned formulae (II) to (IV), is fluorine atom, chlorine atom, bromine atom, or iodine atom, more preferably fluorine atom, chlorine atom, or bromine atom, further preferably fluorine atom or chlorine atom.

When two adjacent $R^5$'s in the above-mentioned formulae (II) to (IV), form a ring, the ring is preferably a 5- to 7-membered ring, and it is further preferable that two adjacent $R^5$'s form —(CH$_2$)$_3$— group, —(CH$_2$)$_4$— group, or —CH═CH—CH═CH— group constituting a ring.

$R^5$ in the above-mentioned formulae (II) to (IV), is preferably a hydrogen atom, a hydrocarbon group having 1 to 9 carbon atoms, a hydrocarbon oxy group having 1 to 9 carbon atoms, or a halogen atom, more preferably a hydrogen atom, a hydrocarbon group having 1 to 9 carbon atoms, or a hydrocarbon oxy group having 1 to 9 carbon atoms, further preferably a hydrogen atom or a hydrocarbon group having 1 to 9 carbon atoms, particularly preferably a hydrogen atom or hydrocarbon group having 1 to 6 carbon atoms.

The divalent hydrocarbon group as $R^6$ in the above-mentioned formula (IV), is preferably an alkylene group having 1 to 9 carbon atoms, an aralkylene group having 7 to 9 carbon atoms, or an arylene group having 6 to 9 carbon atoms. Specific examples thereof include methylene group, 1,1-ethylene group, 1,2-ethylene group, 1,1-propylene group, 1,3-propylene group, 2,2-propylene group, 1,1-butylene group, 2,2-butylene group, 3-methyl-2,2-butylene group, 3,3-dimethyl-2,2-butylene group, 1,1-pentylene group, 3,3-pentylene group, 1,1-hexylene group, 1,1-heptylene group, 1,1-octylene group, 1,1-nonylene group, 1,1-cyclopentylene group, 1,1-cyclohexylene group, phenylmethylene group, 1-phenyl-1,1-ethylene group, 1,2-phenylene group, 1,3-phenylene group, 1,4-phenylene group, and the like.

The divalent substituted hydrocarbon group as $R^6$ in the above-mentioned formula (IV), is preferably an alkylene group having 1 to 9 carbon atoms, an aralkylene group having 7 to 9 carbon atoms, or an arylene group having 6 to 9 carbon atoms, each of which is substituted by a halogen atom, an alkoxy group, di-substituted amino group, and the like. Specific examples thereof include hexafluoro-2,2-propylene group, pentafluorophenylmethylene group, 4-methoxyphenylmethylene group, 4-dimethylaminophenylmethylene group, and the like.

$R^6$ in the above-mentioned formula (IV), is preferably an oxygen atom or a divalent hydrocarbon group, more preferably an alkylene group having 1 to 9 carbon atoms or an aralkylene group having 7 to 9 carbon atoms, further preferably an alkylene group having 1 to 6 carbon atoms.

When a substituted phenol compound represented by the above-mentioned formula (Ia) and/or a 2,6-di-substituted phenol compound represented by the above-mentioned formula (Ib), are used together with a phenol compound represented by the above-mentioned formula (II), a phenol compound represented by the above-mentioned formula (III), and/or a bis-phenol compound represented by the above-mentioned formula (IV), the ratio thereof is appropriately determined within a range in which physical properties of the intended polymer are not deteriorated. The proportion of the above-mentioned substituted phenol (the total amount of a compound represented by the formula (Ia) and/or a compound represented by the formula (Ib)) is preferably 30 mol % or more, more preferably 50 mol % or more, further preferably 80 mol % or more, based on the total amount of all the phenol monomers (these phenols are sometimes referred to as phenolic starting raw materials.).

A polymer obtained by oxidative polymerization of a substituted phenol compound represented by the above-mentioned formula (Ia) of the present invention, is a polymer having repeating units of the following basic structural formula (V) and/or the following basic structural formula (VI).

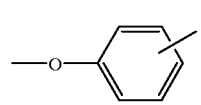

(V)

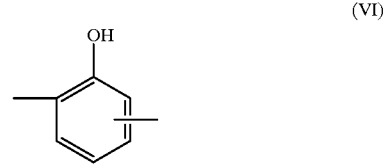

(VI)

In the phenylene rings of the formulae (V) and (VI) above, substituents are omitted.

A polymer obtained by oxidative polymerization of a 2,6-di-substituted phenol compound represented by the above-mentioned formula (Ib) of the present invention, is a polymer having a poly(1,4-phenylene oxide) structure having repeating units of the following basic structural formula (VII).

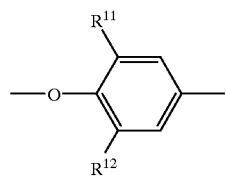

(VII)

The number-average degree of polymerization of the polymer of the present invention is generally 3 or more. When the value of the number-average molecular weight is represented by A, and the value of the molecular weight of a phenolic starting raw material (in the case of a mixture, average molecular weight) is represented by B, the number-average degree of polymerization is A/(B-2). The number-average degree of polymerization is preferably from 3 to 10,000, more preferably from 4 to 1,000, further preferably from 5 to 500.

The polymer of the present invention is preferably a crystalline polymer manifesting a crystal melting point of 5 J/g or more at −100° C. or more, after melting-cooling. In this polymer, the crystal melting point is measured as described below. Namely, differential scanning calorie analysis is carried out under an argon atmosphere, and first, the polymer is cooled to −100° C. at 10° C./min, then, the temperature is raised at 10° C./min from −100° C. to the temperature at which the polymer is completely melted. Then, the polymer is cooled again to −100° C., and if an endothermic peak of 5 J/g or more is found at −100° C. or more, in raising the temperature again at 10° C./min from −100° C. to the temperature at which the polymer is completely melted, this peak top temperature is referred to as crystal melting point, and the peak area is referred to as crystal melting calorie.

The crystal melting point of this polymer is generally −100° C. or more, preferably −100° C. or more and less than 300° C., more preferably −50° C. or more and less than 150° C., further preferably −40° C. or more and less than 100° C., further preferably 0° C. or more and less than 100° C., particularly preferably 0° C. or more and less than 80° C. The crystal melting calorie is generally 5 J/g or more, preferably 7 J/g or more, more preferably 10 J/g or more, further preferably 15 J/g or more, further preferably 20 J/g or more, particularly preferably 30 J/g or more. The upper limit of the heat generation peak calorie in crystallization is generally 200 J/g.

The polymer of the present invention contains substantially no gel portion preferably. No existence of a gel portion can be confirmed, e.g., by dissolution of 1 mg of a polymer in 1 ml of 1,2-dichlorobenzene at 150° C. The phrase "contains substantially no gel portion" means that the proportion of gel portions contained in a polymer, is preferably 5 wt % or less, further preferably 2 wt % or less, and most preferably, means no gel portion contained.

A method for producing the polymer of the present invention is described in detail below.

The above-mentioned oxidative polymerization of phenolic starting raw materials, may be electrolytic oxidative polymerization, however, oxidative polymerization using a catalyst and oxidizer, is preferable from the standpoint of energy saving.

As examples of the catalyst, a monodentate ligand/transition metal complex described in JP-B-36-18692 ("JP-B" means examined Japanese patent publication), JP-A-10-53649 ("JP-A" means unexamined Japanese patent publication), and Japanese Patent Application No. 2000-119826; a bidentate ligand/transition metal complex described in JP-A-10-168179 and Japanese Patent Application No. 2000-121512; a tridentate ligand/transition metal complex described in JP-A-9-144449, 10-45904, 9-324040, Japanese Patent No. 3035559, and JP-A-2000-336166; a quadridentate or a quinquedentate ligand/transition metal complex described in JP-A-8-53545 and 9-324042; a hexadentate or more ligand/transition metal complex described in JP-A-9-324043; a metallocene complex described in JP-A-9-324045; metal fine particles described in JP-A-8-208813; oxidation enzymes described in JP-A-9-107984, and the like are preferable. Further preferable are a monodentate ligand/transition metal complex, a bidentate ligand/transition metal complex, a tridentate ligand/transition metal complex and a quadridentate ligand/transition metal complex, and particularly preferable is a tridentate ligand/transition metal complex. The use amount of these catalysts can be applied, replacing the use amounts for a phenol compound described in the above respectively with the use amounts for the above-mentioned phenolic starting raw materials. Further, also reaction conditions such as a reaction solvent, use amount of a reaction solvent, reaction temperature, and the like, which is described in the above respectively can be applied.

As the oxidizing agent, oxygen or a peroxide is preferable. Oxygen may be mixed with an inert gas, or may be fed in the form of air. As the peroxide, hydrogen peroxide, t-butyl hydroperoxide, di-t-butyl peroxide, cumene hydroperoxide, dicumyl peroxide, peracetic acid, perbenzoic acid, and the like, may be exemplified. Further preferable oxidizing agent is oxygen or hydrogen peroxide. The amount of the oxidizing agent used, is not restricted, however, when oxygen is used, it is generally used in 0.5 equivalent to large excess, and when a peroxide is used, it is generally used in 0.5 to 3 equivalent per phenol.

The oxidation polymer of a substituted phenol of the present invention can be used alone or in the form of a composition with other polymer and/or modifier. As the polymer component of the composition, specifically exemplified examples include polyolefins such as polyethylene, polypropylene, polystyrene, polyvinyl chloride, polymethyl methacrylate, polyvinyl acetate, polyacrylonitrile, and copolymers thereof, and the like; polyethers such as polyoxymethylene, polyphenylene oxide, poly(2,6-dimethyl-1,4-phenylene oxide), poly(2,5-dimethyl-1,4-phenylene oxide), and copolymer thereof, and the like; polyesters such as polyethylene terephthalate, polybutylene terephthalate, poly(ethylene-2,6-dinaphthalate), poly(4-oxybenzoate), poly(2-oxy-6-naphthalate), and copolymers thereof, and the like; polyamides such as nylon 6, nylon 66, and the like; polycarbonates; polyphenylene sulfides; polysulfones; polyether sulfones; polyether ether ketones; polyimides; polyether imides; thermosetting polymers such as a phenol resin, an urea resin, a melamine resin, an epoxy resin, and the like. As the modifier component of the composition, specifically exemplified examples include stabilizers such as 2,6-di-t-butylphenol derivative, 2,2,6,6-tetramethylpiperidine, and the like; flame retardants such as polyhalides, phosphates, and the like; surfactants; flow modifiers.

The novel oxidation polymer of substituted phenols of the present invention has a substituent composed of a large number of carbon atoms, and it can be crystallized at a specific temperature. When solubility based on a side chain group of the polymer, is utilized, the use in a polymer alloy compatibilizer, and the like, is expected. When crystallinity based on a side chain group thereof, is utilized, the use in a thermoplastic elastomer and the like, is expected. Further, when optical property is utilized, the use in display materials, thermosensors, and the like, is expected. Accordingly the industrial significance thereof is high. The novel oxidation polymer of a substituted phenol can be produced by a method that uses no formalin, and that is a comparatively low-temperature reaction including normal temperature, and that is an environmentally mild method whose by-product is water only.

The present invention is explained in more detail based on the following examples, but the scope of the present invention is not limited by these examples.

EXAMPLE (i) Monomer Synthesis and Analysis

Monomer synthesis: Monomers to be used were synthesized referring to J. Am. Chem. Soc., 114, 1790 (1992); J. Chem. Soc. Perkin Trans. 1, 257 (1997); or J. Am. Chem. Soc. 94, 4374 (1972).

Conversion of monomer (Conv.): 15 mg of a reaction mixture, containing diphenyl ether as an internal standard substance, was sampled, and to this was added concentrated hydrochloric acid, in a slight amount, to acidify the mixture, and to this was added 2 g of methanol, to obtain a measuring sample. This sample was analyzed by high-performance liquid chromatography (SC8020 System, tradename, manufactured by Tosoh Corp.; detector: PD-8020, tradename, manufactured by Tosoh Corp.; detection wavelength: 278 nm; column: ODS-AM, tradename, manufactured by YMC; developing solvent: methanol/water or tetrahydrofuran/methanol/water), and quantified using diphenyl ether as an internal standard substance.

Solubility of polymer: 1 mg of a polymer was added to 1 ml of 1,2-dichlorobenzene (abbreviated as ODCB), and the mixture was heated to 150° C., and the presence or absence of insoluble parts (gel portion) was observed.

Number-average molecular weight (Mn), weight-average molecular weight (Mw) of polymer: Analysis was effected by gel permeation chromatography, and the weight-average molecular weight (Mw) and number-average molecular weight (Mn) were measured in terms of standard polystyrene. oDCB/140° C. condition: An operation was conducted at 140° C. by PL-GPC210 System (tradename) with RI detection, manufactured by Polymer Laboratories, using as the column, three Plgel 10 um MIXED-B, tradename, manufactured by Polymer Laboratories, and using oDCB (containing 0.01 w/v % 2,6-di-t-butyl-4-methylphenol) as a developing solvent. THF/40° C. condition: An operation was conducted at 40° C. by SC8020 System (tradename) with 280 nm detection, manufactured by TOSOH, using as the column, G4000HRL, G3000HRL, G2500HRL, and G2000HRL (tradename respectively, four in total), manufactured by TOSOH, and using tetrahydrofuran (abbreviated as THF) as a developing solvent.

Crystal melting point (Tm) and crystal melting calorie (Hm) of polymer: Differential scanning calorie analysis (DSC3200S, tradename, manufactured by MAC SCIENCE) was conducted under an argon atmosphere. First, a polymer was cooled at 10° C./min to −100° C., and if an endothermic peak of 5 J/g or more was found at −100° C. or more, in raising the temperature at 10° C./min from −100° C. to the temperature at which the polymer was completely melted, this peak top temperature was referred to as the initial crystal melting point (Tm'), and the peak area was referred to as the initial crystal melting calorie (Hm'). Then, the polymer was cooled again to −100° C., then, and if an endothermic peak of 5 J/g or more was found at −100° C. or more, in raising temperature again at 10° C./min from −100° C., this peak top temperature was referred to as the crystal melting point (Tm), and the peak area was referred to as the crystal melting calorie (Hm). When this peak was not found, the result was represented by N.D.

(ii) Oxidative Polymerization

Example 1

A 25-ml, two-necked, round-bottomed flask equipped with a magnetic stirrer, was attached with a 2 L rubber balloon filled with oxygen, and the inner space of the flask was replaced by oxygen. Into this, was placed 0.03 mmol of $Cu(Cl)_2$ (1,4,7-triisopropyl-1,4,7-triazacyclononane) (see J. Am. Chem. Soc., 120, 8529, (1998), abbreviated Cu(tacn)), and then a solution, prepared by dissolving 0.6 mmol of 2-n-octadecylphenol, and 0.3 mmol of 2,6-diphenylpyridine as a base, in 1.2 g of toluene, was added. This mixture was stirred vigorously while keeping the temperature at 40° C. After 48 hours, concentrated hydrochloric acid was added, to make the mixture acidic, and then 25 ml of methanol was added, and the precipitated polymer was filtrated. The polymer was washed three times with 10 ml of methanol and dried under reduced pressure, to obtain a polymer. The results of analyses of this polymer are shown in Table 1.

This polymer was NMR-analyzed (LA600, tradename, manufactured by JEOL) at 60° C. in oDCB-d4. $^1$H-NMR (600 MHz) showed peaks at 0.87 ppm (3H), 1.27 to 1.64 ppm (32H), 2.67 ppm (2H). In $^{13}$C-NMR (150 MHz), main peaks were observed at 14.1 ppm, 22.9 ppm, 29.6 to 30.0 ppm (15 peaks), 32.1 ppm, 115.8 ppm, 119.5 ppm, 120.6 ppm, 136.0 ppm, 150.1 ppm, and 154.6 ppm, and several small unknown peaks were also detected from 115 to 155 ppm. From these results, it was found that the polymer obtained in this example, had mainly a 2-n-octadecyl-1,4-phenylene oxide structure.

This polymer was analyzed by powder X-ray analysis (RINT2500V, tradename, manufactured by Rigaku Denki K.K.; X ray: Cu-Kα, 50 kV-300 mA; angle measuring range: 2 to 140°; slit: DS-0.5°, RS-0.15 mm, SS-0.5°). As a result, it observed the largest peak at 2θ=21.5° (spacing 4.1 Å). The degree of crystallization was measured by Rouland method. As a result, it found that it was 32%.

Examples 2 and 3

The polymers were obtained in the same manner as in Example 1, except that the reaction time was changed as shown in Table 1. The results of analyses of these polymers are shown in Table 1.

The polymer of Example 2 was measured by a polarization microscope (XTP-11 type, equipped with a heating stage, manufactured by Nikon Corporation). As a result, when the polymer was heated from room temperature to about 50° C., the transmission light quantity increased (optical anisotropy), however, dark field was observed at 52° C. (optical isotropy).

Example 4

A 25-ml, two-necked, round-bottomed flask equipped with a magnetic stirrer, was attached with a 2 L rubber balloon filled with oxygen, and the inner space of the flask was replaced by oxygen. Into this, was placed 0.015 mmol of [Cu(Cl)(OH)(N,N,N',N'-tetramethylethylenediamine)]$_2$ (abbreviated as Cu(tmed)), and then a solution, prepared by dissolving 0.6 mmol of 2-n-octadecylphenol, and 0.3 mmol of 2,6-diphenylpyridine as a base, in 1.2 g of toluene, was added. This mixture was stirred vigorously while keeping the temperature at 40° C. After 24 hours, the same post-treatment was conducted as in Example 1, to obtain a polymer. The results of analyses of this polymer are shown in Table 1.

Example 5

A 25-ml, two-necked, round-bottomed flask equipped with a magnetic stirrer, was attached with a 2 L rubber balloon filled with oxygen, and the inner space of the flask was replaced by oxygen. Into this, was placed 0.03 mmol of CuCl, and then a solution, prepared by dissolving 0.6 mmol of 2-n-octadecylphenol and 1.5 mmol of pyridine, in 1.2 g of toluene, was added (the catalyst is abbreviated as CuCl/Py). This mixture was stirred vigorously while keeping the temperature at 40° C. After 29 hours, the same post-treatment was conducted as in Example 1, to obtain a polymer. The results of analyses of this polymer are shown in Table 1.

Example 6

Into a 100-ml egg-plant type flask equipped with a magnetic stirrer, 0.025 mmol of (bis(salycilydeneimino)ethane)iron (abbreviated as Fe(salen)) was placed, and then a solution, prepared by dissolving 0.5 mmol of 2-n-octadecylphenol in 15 ml of dioxane, was added. To this, was added 1 mmol of 6% hydrogen peroxide dropwise, while stirring vigorously and keeping the temperature at 40° C., over 5 hours. The precipitated polymer was filtrated, and washed three times with 5 ml of dioxane and three times with 10 ml of methanol, and dried under reduced pressure, to obtain a polymer. The results of analyses of this polymer are shown in Table 1.

Examples 7 to 12

Polymers were obtained in the same manner as in Example 1, except that the monomer, amount of catalyst, and reaction time, were changed as shown in Table 1. The results of analyses of these polymers are shown in Table 1.

TABLE 1

| | Monomer | Catalyst (metal portion mol % for monomer) | Reaction time (h) | Monomer conversion (%) | Polymer yield (%) | Solubility (oDCB/150° C.) | Mn (oDCB/140° C.) | Mw (oDCB/140° C.) | Tm (° C.) | Hm (J/g) |
|---|---|---|---|---|---|---|---|---|---|---|
| Example 1 | 2-n-octadecylphenol | Cu(tacn) (5) | 48 | 98 | 90 | Solved | 5400 | 10900 | 39 | 60 |
| Example 2 | 2-n-octadecylphenol | Cu(tacn) (5) | 24 | 94 | 73 | Solved | 4500 | 8500 | 40 | 70 |
| Example 3 | 2-n-octadecylphenol | Cu(tacn) (5) | 240 | 100 | 93 | Solved | 13500 | 55500 | 38 | 60 |
| Example 4 | 2-n-octadecylphenol | Cu(tmed) (5) | 24 | 100 | 90 | Solved | 4100 | 7100 | 39 | 59 |
| Example 5 | 2-n-octadecylphenol | CuCl/Py (5) | 29 | 100 | 85 | Solved | 2900 | 4500 | 40 | 64 |
| Example 6 | 2-n-octadecylphenol | Fe(salen) (5) | 21 | 98 | 69 | Partially insoluble | 3400* | 6300* | 31 | 41 |
| Example 7 | 2-n-dodecylphenol | Cu(tacn) (5) | 48 | 98 | 91 | Solved | 7200** | 19800** | −32 | 9 |
| Example 8 | 2-n-pentadecylphenol | Cu(tacn) (5) | 48 | 98 | 90 | Solved | 4100 | 9700 | 17 | 47 |
| Example 9 | 2-n-docosylphenol | Cu(tacn) (5) | 48 | 99 | 89 | Solved | 7300 | 12800 | 59 | 81 |
| Example 10 | 3-n-pentadecylphenol | Cu(tacn) (0.5) | 192 | 47 | 23 | Solved | 4200 | 6900 | 19 | 40 |
| Example 11 | 4-n-octadecylphenol | Cu(tacn) (5) | 28 | 98 | 77 | Solved | 2600 | 3200 | 50 | 43 |
| Example 12 | 2-(2-octadecylphenol) | Cu(tacn) (5) | 52 | 97 | 88 | Solved | 4200 | 6900 | 18 | 38 |

*Measuring only soluble part
**THF/40° C.

Examples 13 to 19

Two kinds of polymers were obtained in the same manner as in Example 1, except that copolymerization was conducted as shown in Table 2. The results of analyses of these polymers are shown in Table 2.

TABLE 2

| | Monomer (1) (mol %) | Monomer (2) (mol %) | Monomer (1) conversion (%) | Monomer (2) conversion (%) | Polymer yield (%) | Solubility (oDCB/150° C.) | Mn (oDCB/140° C.) | Mw (oDCB/140° C.) | Tm (° C.) | Hm (J/g) |
|---|---|---|---|---|---|---|---|---|---|---|
| Example 13 | 2-n-octadecylphenol (25) | 2-n-pentadecylphenol (75) | 99 | 99 | 92 | Solved | 5700 | 18100 | 21 | 44 |
| Example 14 | 2-n-octadecylphenol (50) | 2-n-pentadecylphenol (50) | 99 | 98 | 94 | Solved | 6000 | 19000 | 26 | 51 |
| Example 15 | 2-n-octadecylphenol (75) | 2-n-pentadecylphenol (25) | 98 | 98 | 85 | Solved | 5900 | 12700 | 33 | 55 |

TABLE 2-continued

|  | Monomer (1) (mol %) | Monomer (2) (mol %) | Monomer (1) conversion (%) | Monomer (2) conversion (%) | Polymer yield (%) | Solubility (oDCB/150° C.) | Mn (oDCB/140° C.) | Mw | Tm (° C.) | Hm (J/g) |
|---|---|---|---|---|---|---|---|---|---|---|
| Example 16 | 2-n-octadecylphenol (75) | 2-n-dodecylphenol (25) | 99 | 98 | 72 | Solved | 5500 | 11900 | 31 | 53 |
| Example 17 | 2-n-octadecylphenol (75) | 2-n-docosylphenol (25) | 98 | 98 | 81 | Solved | 6000 | 11400 | 42 | 78 |
| Example 18 | 2-n-octadecylphenol (50) | 2-methylphenol (50) | 98 | 99 | 83 | Solved | 9800 | 17200 | 27 | 38 |
| Example 19 | 2-n-octadecylphenol (75) | 2-methylphenol (25) | 99 | 100 | 87 | Solved | 3600 | 9600 | 34 | 58 |

Example 20

A 25-ml, two-necked, round-bottomed flask equipped with a magnetic stirrer, was attached with a 2 L rubber balloon filled with oxygen, and the inner space of the flask was replaced by oxygen. Into this, was placed 0.03 mmol of Cu(tacn), and then a solution, prepared by dissolving 0.6 mmol of 2-n-octadecyl-6-methylphenol, and 3 mmol of pyridine as a base, in 1.2 g of toluene, was added. This mixture was stirred vigorously while keeping the temperature at 40° C. After 24 hours, the same post-treatment was conducted as in Example 1, to obtain a polymer. The results of analyses of this polymer are shown in Table 3.

This polymer was NMR-analyzed at room temperature (LA600, tradename, manufactured by JEOL) in chloroform-dl. $^1$H-NMR (600 MHz) showed peaks only at 0.87 ppm (3H,t), 1.20 to 1.58 ppm (32H,m), 2.09 ppm (3H,s), 2.41 ppm (2H,m), 6.45 ppm (1H,s), and 6.48 ppm (1H,s). $^{13}$C-NMR (150 MHz) showed peaks only at 14.1 ppm, 16.9 ppm, 22.7 ppm, 29.4 to 30.3 ppm (15 peaks), 31.9 ppm, 113.7 ppm, 114.5 ppm, 132.5 ppm, 137.1 ppm, 145.1 ppm, and 155.2 ppm. From these results, it was found that the polymer obtained in this example, had only a 2-n-octadecyl-6-methyl-1,4-phenylene oxide structure.

This polymer was analyzed by powder X-ray analysis (RINT2500V, tradename, manufactured by Rigaku Denki K.K.; X ray: Cu-Kα, 50 kV-300 mA; angle measuring range: 2 to 140°; slit: DS-0.5°, RS-0.15 mm, SS-0.5°). As a result, it observed the largest peak at 2θ=21.4° (spacing 4.1 Å). The degree of crystallization was measured by Rouland method. As a result, it found that it was 28%.

Examples 21 and 22

The polymers were obtained in the same manner as in Example 20, except that the monomer was changed as shown in Table 3, and the amount of toluene was changed to 2.4 g in Example 22. The results of analyses of these polymers are shown in Table 3.

Comparative Example 1

The polymer was obtained in the completely same manner as in Example 1, except that 2-n-nonylphenol as monomer was used instead of 2-n-octadecylmethylphenol. The result of analysis of the polymer is shown in Table 4.

Comparative Example 2

In the case of poly(2,6-dimethyl-1,4-phenylene oxide) (purchased from Aldrich, Mn. is to 32000), Tm' was 251° C., and Hm' was 14 J/g, however, Tm and Hm were not detected.

In melt-molding, which is the most important molding method for polymers, property of a polymer after melting-cooling, cooling, not its initial property, determines its practical performance. Therefore, crystal melting point (Tm) and crystal melting calorie (Hm) are practically much more significant than initial crystal melting point (Tm') and initial crystal melting calorie (Hm'). In all of the above cases where Tm and Hm were detected, Tm' and Hm' were also detected.

TABLE 3

|  | Monomer | Reaction time (h) | Monomer conversion (%) | Polymer yield (%) | Solubility (oDCB/150° C.) | Mn (oDCB/140° C.) | Mw | Tm' (° C.) | Hm' (J/g) | Tm (° C.) | Hm (J/g) |
|---|---|---|---|---|---|---|---|---|---|---|---|
| Example 20 | 2-n-octadecyl-6-methyl phenol | 24 | 100 | 89 | Solved | 15900 | 27900 | 40 | 47 | 34 | 49 |
| Example 21 | 2-(2-octadecyl)-6-methyl phenol | 24 | 99 | 79 | Solved | 3300 | 9100 | 9 | 30 | 12 | 27 |
| Example 22 | 2,6-di-n-octadecylphenol | 29 | 100 | 91 | Solved | 6400 | 14600 | 73 | 106 | 66 | 98 |

TABLE 4

|  | Monomer | Reaction time (h) | Monomer conversion (%) | Polymer yield (%) | Solubility (oDCB/150° C.) | Mn (oDCB/140° C.) | Mw | Tm' (° C.) | Hm' (J/g) | Tm (° C.) | Hm (J/g) |
|---|---|---|---|---|---|---|---|---|---|---|---|
| Comparative Example 1 | 2-n-nonylphenol | 48 | 99 | 78 | Solved | 8200 | 17100 | N.D. | N.D. | N.D. | N.D. |

What we claim is:

1. An oxidation polymer of a substituted phenol, which is obtained by oxidative polymerization of at least one substituted phenol compound selected from the group consisting of a substituted phenol compound represented by the following formula (Ia), and a 2,6-di-substituted phenol compound represented by the following formula (Ib), wherein the oxidation polymer has a number-average degree of polymerization of 3 or more and wherein the oxidation polymer has a crystal melting point providing crystal melting calories of from 5 J/g to less than 200 J/g, at −100° C. to less than 300° C. after melt-cooling:

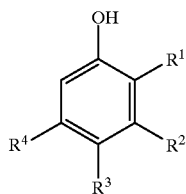
(Ia)

wherein, in formula (Ia), $R^1$, $R^2$, $R^3$, and $R^4$ each individually represent a hydrogen atom, a substituted or unsubstituted hydrocarbon group, a substituted or unsubstituted hydrocarbon oxy group, a substituted or unsubstituted amino group, a substituted or unsubstituted mercapto group, or a halogen atom; $R^1$ and $R^2$, $R^2$ and $R^3$, or $R^3$ and $R^4$ may form a ring; provided that at least one of $R^1$ to $R^4$ represents a substituted or unsubstituted, saturated hydrocarbon group having 10 or more carbon atoms, and $R^1$ and/or $R^4$ represent a hydrogen atom; and

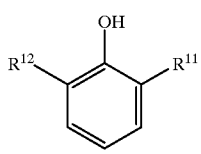
(Ib)

wherein, in formula (Ib), $R^{11}$ represents a substituted or unsubstituted, saturated hydrocarbon group having 15 or more carbon atoms, and $R^{12}$ is the same group as $R^{11}$, or when $R^{12}$ is different from $R^{11}$, $R^{12}$ represents a substituted or unsubstituted hydrocarbon group, a substituted or unsubstituted hydrocarbon oxy group, a substituted or unsubstituted amino group, a substituted or unsubstituted mercapto group, or a halogen atom.

2. An oxidation polymer of a substituted phenol, as described in claim 1, which is obtained by oxidative polymerization of at least one substituted phenol compound selected from the group consisting of a substituted phenol compound represented by formula (Ia) and the 2,6-di-substituted phenol compound represented by formula (Ib), together with at least one compound selected from the group consisting of a phenol compound represented by formula (II), a phenol compound represented by formula (III), and a bis-phenol compound represented by formula (IV):

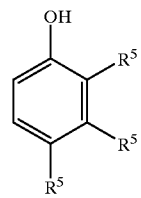
(II)

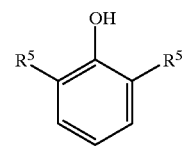
(III)

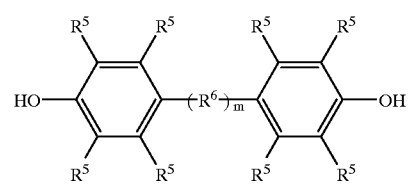
(IV)

wherein each of $R^5$ individually represent a hydrogen atom, a substituted or unsubstituted hydrocarbon group having 1 carbon atoms, a substituted amino group having 1 to 9 carbon atoms, a mercapto group, a substituted mercapto group having 1 to 9 carbon atoms, or a halogen atom; two adjacent $R^5$ may form a ring; $R^6$ represent an oxygen atom, sulfur atom, a divalent hydrocarbon group, or a divalent substituted hydrocarbon group, and m is 1 or 0.

3. The oxidation polymer of a substituted phenol as described in claim 1, wherein at least one of $R^1$ to $R^4$ is a substituted or unsubstituted, saturated hydrocarbon group having 10 to 100 carbon atoms.

4. The oxidation polymer of a substituted phenol as described in claim 1, wherein at least one of $R^1$ to $R^4$ is a substituted or unsubstituted, saturated hydrocarbon group having 10 to 50 carbon atoms.

5. The oxidation polymer of a substituted phenol as described in claim 1, wherein at least one of $R^1$ to $R^4$ is an alkyl group having 10 to 50 carbon atoms, represented by —$(CH_2)_{n-1}CH_3$— or —$CH(CH_3)(CH_2)_{n-3}CH_3$ (wherein n represents the number of carbon atoms).

6. The oxidation polymer of a substituted phenol as described in claim 1, wherein at least one of $R^1$ to $R^4$ is an alkyl group having 12 to 30 carbon atoms, represented by —$(CH_2)_{n-1}CH_3$— or —$CH(CH_3)(CH_2)_{n-3}CH_3$ (wherein n represents the number of carbon atoms).

7. The oxidation polymer of a substituted phenol as described in claim 1, wherein each of $R^1$ to $R^4$ individually represent a hydrogen atom, an alkyl group having 1 to 100 carbon atoms, a cycloalkyl group having 3 to 100 carbon atoms, an aralkyl group having 7 to 9 carbon atoms, an aryl group having 6 to 9 carbon atoms, an alkoxy group having 1 to 9 carbon atoms, a cycloalkoxy group having 3 to 9 carbon atoms, an aralkyloxy group having 7 to 9 carbon atoms, an aryloxy group having 6 to 9 carbon atoms, a fluorine atom, or a chlorine atom.

8. The oxidation polymer of a substituted phenol as described in claim 1, wherein each of $R^1$ to $R^4$ individually represent a hydrogen atom, or an alkyl group having 1 to 50 carbon atoms.

9. The oxidation polymer of a substituted phenol as described in claim 1, wherein $R^{11}$ represents a substituted or unsubstituted, saturated hydrocarbon group having 15 to 100 carbon atoms.

10. The oxidation polymer of a substituted phenol as described in claim 1, wherein $R^{11}$ represents a saturated hydrocarbon group having 16 to 50 carbon atoms.

11. The oxidation polymer of a substituted phenol as described in claim 1, wherein $R^{11}$ represents an alkyl group having 16 to 50 carbon atoms, represented by —$(CH_2)_{n-1}CH_3$— or —$CH(CH_3)(CH_2)_{n-3}CH_3$ (wherein n represents the number of carbon atoms).

12. The oxidation polymer of a substituted phenol as described in claim 1, wherein $R^{11}$ represents an alkyl group having 18 to 30 carbon atoms, represented by —$(CH_2)_{n-1}CH_3$— or —$CH(CH_3)(CH_2)_{n-3}CH_3$ (wherein n represents the number of carbon atoms).

13. The oxidation polymer of a substituted phenol as described in claim 1, wherein, when $R^{12}$ is different from $R^{11}$, $R^{12}$ represents a hydrocarbon group having 1 to 9 carbon atoms, a hydrocarbon oxy group having 1 to 9 carbon atoms, or a halogen atom.

14. The oxidation polymer of a substituted phenol as described in claim 1, wherein, when $R^{12}$ is different from $R^{11}$, $R^{12}$ represents a hydrocarbon group having 1 to 6 carbon atoms.

15. The oxidation polymer of a substituted phenol as described in claim 1, which has a number-average degree of polymerization of 5 to 500.

16. The oxidation polymer of a substituted phenol as described in claim 1, wherein a crystal melting point is 0° C. or higher and less than 100° C.

17. The oxidation polymer of a substituted phenol as described in claim 1, wherein a crystal melting point is 20 J/g or more.

18. An oxidation polymer of a substituted phenol which is obtained by oxidative polymerization of at least one substituted phenol compound selected from the group consisting of a substituted phenol compound represented by the following formula (Ia), wherein the oxidation polymer has a number-average degree of polymerization of 5 to 500, and a crystal melting point giving crystal melting calories of 20 J/g or more and less than 200 J/g, at 0° C. or higher and less than 100° C. after melting-cooling:

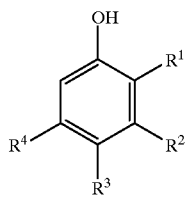

(Ia)

wherein $R^1$, $R^2$, $R^3$, and $R^4$ each individually represent a hydrogen atom, or an alkyl group having 1 to 50 carbon atoms; $R^1$ and $R^2$, $R^2$ and $R^3$, or $R^3$ and $R^4$ may form a ring; provided that at least one of $R^1$ to $R^4$ represents an alkyl group having 10 to 50 carbon atoms, represented by —$(CH_2)_{n-1}CH_3$— or —$CH(CH_3)(CH_2)_{n-3}CH_3$ (wherein n represents represents the number of carbon atoms), and $R^1$ and/or $R^4$ represent a hydrogen atom.

19. An oxidation polymer of a substituted phenol, which is obtained by oxidative polymerization of at least one substituted phenol compound selected from the group consisting of a 2,6-di-substituted phenol compound represented by the formula (Ib), wherein the oxidation polymer has a number-average degree of polymerization of 5 to 500, and which has a crystal melting point giving crystal melting calories of 20 J/g or more and less than 200 J/g, at 0° C. or higher and less than 100° C. after melting-cooling:

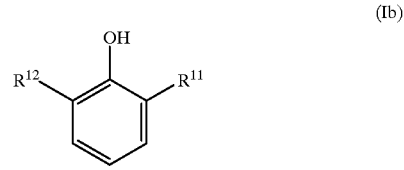

(Ib)

wherein $R^{11}$ represents an alkyl group having 15 to 50 carbon atoms, represented by —$(CH_2)_{n-1}CH_3$— or —$CH(CH_3)(CH_2)_{n-3}CH_3$ (wherein n represents the number of carbon atoms), and $R^{12}$ is the same group as $R^{11}$, when $R^{12}$ is different from $R^{11}$, $R^{12}$ represents a hydrocarbon group having 1 to 6 carbon atoms.

20. The oxidation polymer of substituted phenol of claim 1, wherein a polymer obtained by oxidative polymerization of a substituted phenol compound, represented by the formula (Ia), is a polymer having repeating units of the following basic structural formula (V) and/or the following basic structural formula (VI),

(V)

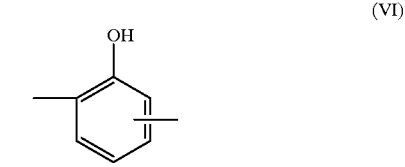

(VI)

wherein the substituents in formulas (V) and (VI) are omitted for clarity, and wherein a polymer obtained by oxidative polymerization of a 2,6-di-substituted phenol compound, represented by the formula (Ib), is a polymer having a poly(1,4-phenylene oxide) structure having repeating units of the following basic structural formula (VII)

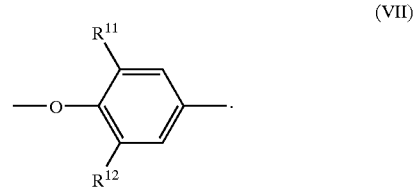

(VII)

* * * * *